United States Patent Office 3,836,666
Patented Sept. 17, 1974

3,836,666
PHARMACEUTICAL COMPOSITIONS CONTAINING CERTAIN 1 - (CYANO-PHENOXY)-2-HYDROXY - 3 - (CYCLOALKYL-AMINO)-PROPANES AND METHOD OF USE
Herbert Köppe, Werner Kummer, Helmut Stähle, and Karl Zeile, Ingelheim am Rhein, Albrecht Engelhardt, Mainz, and Werner Traunecker, Munster-Sarmsheim, Germany, assignors to Boehringer Ingelheim G.m.b.H., Ingelheim am Rhein, Germany
No Drawing. Original application July 22, 1970, Ser. No. 57,353, now Patent No. 3,755,413. Divided and this application Apr. 30, 1973, Ser. No. 355,708
Claims priority, application Germany, July 23, 1969,
P 19 37 477.7
Int. Cl. A61k 27/00
U.S. Cl. 424—304                12 Claims

ABSTRACT OF THE DISCLOSURE

β-Adrenolytic pharmaceutical compositions containing as an active ingredient a compound of the formula

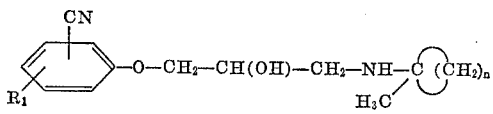

wherein $R_1$ is hydrogen or methyl, and
$n$ is 4, 5 or 6, or a non-toxic, pharmacologically acceptable acid addition salt thereof; and methods of using the same.

---

This is a division of copending application Ser. No. 57,353, filed July 22, 1970, now Pat. No. 3,755,413.

This invention relates to novel pharmaceutical compositions containing as an active ingredient a 1-(cyanophenoxy)-2-hydroxy-3-(cycloalkyl-amino)-propane or an acid addition salt thereof.

More particularly, the present invention relates to novel pharmaceutical dosage unit compositions containing as an active ingredient a compound of the formula

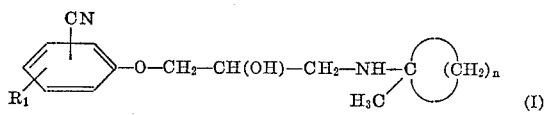

wherein $R_1$ is hydrogen or methyl, and
$n$ is 4, 5 or 6, or a non-toxic, pharmacologically acceptable acid addition salt thereof.

The compounds embraced by formula I may be prepared by a number of methods involving well known chemical principles, among which the following has proved to be particularly convenient and efficient:

By reacting a compound of the formula

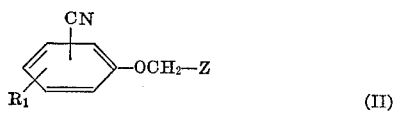

wherein $R_1$ has the same meanings as in formula I and Z is

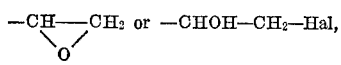

where Hal is halogen, with a cycloakylamine of the formula

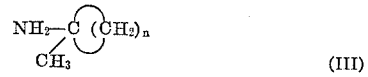

wherein $n$ has the same meaning as in formula I.

Some of the starting compounds required for this method are known, while the others may be obtained according to the conventional processes. Thus, the epoxides of the formula II may easily be prepared by reacting a corresponding phenol or phenolate of the formula

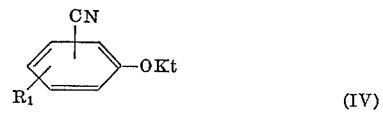

wherein $R_1$ has the same meaning as in formula I and Kt represents hydrogen or a cation (for example, an alkali metal cation). The epoxides, in turn, may be used for the preparation of the halohydrins of the formula II by reaction of the epoxides with the corresponding hydrohalic acid.

The amines of the formula III may be prepared from the corresponding carbinols according to the so-called Ritter reaction [see J.A.C.S. 70 (1948), 4048] by reaction with KCN in glacial acetic acid and cleavage of the formamide thus formed with KOH.

The compounds of the formula I comprise an asymmetric carbon atom in the CHOH-group and therefore occur as racemates as well as in the form of optical antipodes. The latter may be obtained not only by means of separation of racemates with the usual auxiliary acids, such as dibenzoyl-D-tartaric acid or D-3-bromo-camphor-8-sulfonic acid, but also by using the corresponding optically active starting material.

The 1 - phenoxy - 3-cycloalkylamino-propanols of the formula I may be converted into non-toxic pharmaceutically acceptable acid addition salts in conventional fashion. Examples of such salts are, for instance, those formed with hydrochloric acid, hydrobromic acid, sulfuric acid, methane-sulfonic acid, maleic acid, acetic acid, oxalic acid, lactic acid, tartaric acid, 8-chlorotheophylline or the like.

The following examples further illustrate the present invention and will enable others skilled in the art to understand it more completely. It should be understood, however, that the invention is not limited solely to the particular examples given below.

EXAMPLE 1

1-(2'-Cyano-phenoxy)-2-hydroxy-3-(1''-methylcyclohexyl-amino)-propane hydrochloride 8.75 gm. (0.05 mol) of 1-(2'-cyanophenoxy)-2,3-epoxypropane were dissolved in 100 ml. of ethanol, and 25 ml. of a 2 M solution of 1-methylcyclohexylamine were added. After two hours of refluxing the solvent was distilled off, and the residue was treated with 200 ml. of water. The aqueous mixture was acidified with HCl, heated to 60° C. and separated from insoluble matter. The cooled aqueous phase was made alkaline with NaOH after extraction with ether, and the precipitated base was extracted with ether. The organic phase was washed with water and dried over MgSO₄. After distilling off the ether, the remaining crystalline base was recrystallized from ethylacetate by addition of petroleum ether. The dry substance was dissolved in a little acetonitrile, ethereal HCl was added, and the crystalline hydrochloride was collected by vacuum filtration. Yield: 5.8 gm., m.p. 163–165° C.

EXAMPLE 2

1-(2'-Cyano-phenoxy)-2-hydroxy-3-(1'''-methylcyclopentylamino)-propane hydrochloride 7.8 gm. (0.045 mol) of 1-(2'-cyano-phenoxy)-2,3-epoxy-propane were dissolved in 100 ml. of methanol, 5.5 gm. (0.055 mol) of 1-methylcyclopentylamine were added, and the mixture was refluxed for three hours. After distilling off the solvent, the residue was treated with 1 N HCl, and insoluble matter was filtered off. After extracting the aqueous phase with ether, the former was made alkaline with NaOH$_3$, and the precipitated base was taken up in ether. The organic phase was washed with water and dried over MgSO$_4$. After distilling off the ether, the crystalline base was dissolved in ethanol, ethereal HCl was added, and the precipitated hydrochloride was collected by vacuum filtration and recrystallized from ethanol by addition of ether. Yield: 4.5 gm., m.p. 132–134° C.

EXAMPLE 3

Analogous to Example 1, 1 - (2' - methyl-4'-cyanophenoxy) - 2 - hydroxy - 3 - (1''-methylcyclohexylamino)-propane hydrochloride was prepared from 1-(2'-methyl-4'-cyano-phenoxy) - 2,3 - epoxy-propane and 1-methylcyclohexylamine. M.p. of the HCl addition salt: 206–207° C.

EXAMPLE 4

Analogous to Example 1, 1-(2'-cyano-phenoxy)-2-hydroxy - 3 - (1'''-methylcycloheptylamino)-propane hydrochloride was prepared from 1-(2'-cyano-phenoxy)-2,3-epoxy-propane and 1-methylcycloheptylamine. The hydrochloride had a melting point of 160–161° C.

EXAMPLE 5

Analogous to Example 1, 1 - (2' - cyano-5'-methylphenoxy) - 2 - hydroxy-3-(1''-methylcyclohexylamino)-propane was prepared from 1-(2'-cyano-5'-methylphenoxy)-2,3-epoxy-propane and 1-methylcyclohexylamine in ethanol. M.p. (hydrochloride): 173–176° C.

EXAMPLE 6

Analogous to Example 1, 1 - (2' - cyano-5'-methylphenoxy) - 2 - hydroxy - 3-(1''-methylcycloheptylamino)-propane was prepared from 1-(2'-cyano-5'-methylphenoxy)-2,3-epoxy-propane and 1-methylcycloheptylamine in ethanol while refluxing. M.p. (hydrochloride): 192-194° C.

EXAMPLE 7

Analogous to Example 1, 1 - (2' - cyano-5'-methylphenoxy) - 2 - hydroxy - 3-(1''-methylcyclopentylamino)-propane was prepared from 1 - (2' - cyano-5'-methylphenoxy) - 2,3-epoxy-propane and 1-methylcyclopentylamine. M.p. (hydrochloride): 143–146° C.

The compounds embraced by formula I above and their non-toxic, pharmacologically acceptable acid addition salts, have useful pharmacodynamic properties. More particularly, they exhibit very effective β-adrenergic receptor blocking activities in warm-blooded animals, such as guinea pigs, and are therefore useful therapeutics for the treatment and prophylaxis of diseases of the coronaries and for the treatment of cardiac arrythmia, especially tachycardia. The compounds also exhibit effective hypotensive activities.

The following specific compounds and their nontoxic acid addition salts are of special interest:

1-(2'-cyano-phenoxy)-2-hydroxy-3-(1''-methylcyclopentyl-amino)-propane; and
1-(2'-cyano-phenoxy)-2-hydroxy-3-(1''-methylcyclohexyl-amino)-propane.

1-(2'-cyano-phenoxy) - 2 - hydroxy-3-(1''-methylcyclopentyl-amino)-propane is especially interesting due to its pronounced isoproterenol-antagonistic action with virtually complete absence of direct bradycardiac action. Compounds of the formula I wherein the phenyl group is substituted with a cyano group in 2-position and simultaneously with a methyl group in 5-position are also especially effective; for instance, 1-(2'-cyano-5'-methyl-phenoxy)-2-hydroxy-3-(1'''-methylcyclopentylamino)-propane,
1-(2'-cyano-5'-methyl-phenoxy)-2-hydroxy-3-(1'''-methylcyclohexylamino)-propane, and
1-(2'-cyano-5'-methylphenoxy)-2-hydroxy-3-(1'-methylcycloheptylamino)-propane and the non-toxic, pharmaceutically acceptable acid addition salts thereof.

For pharmaceutical purposes the compounds of the formula I are administered to warm-blooded animals perorally or parenterally as active ingredients in customary dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. Such dosage unit compositions may, in addition to a compound of the present invention, also comprise an effective dosage unit of one or more compounds having a different pharmacodynamic property, such as a coronary dilator, a sympathomimetic, a cardiac glycoside and/or a tranquilizer.

One effective dosage unit of the compounds according to the present invention is from 0.0166 to 5.0 mgm./kg. body weight, preferably 0.083 to 1.67 mgm./kg. (perorally) and 0.0166 to 0.34 mgm./kg. (parenterally).

The following examples illustrate a few dosage unit compositions comprising a compound of the formula I as an active ingredient and represent the best modes contemplated of putting the invention into practical use. The parts are parts by weight unless otherwise specified.

EXAMPLE 8

Tablets

The tablet composition was compounded from the following ingredients:

| | Parts |
|---|---|
| 1-(2'-cyano - phenoxy) - 2 - hydroxy-3-(1''-methylcyclopentylamino)-propane·HCl | 40.0 |
| Corn starch | 164.0 |
| Secondary calcium phosphate | 240.0 |
| Magnesium stearate | 1.0 |
| Total | 445.0 |

Preparation: The individual components were intimately admixed with each other, the mixture was granulated in customary fashion, and the granulate was compressed into 445 mgm.-tablets with a conventional tablet making machine. Each tablet contained 40 mgm. of the propanol salt and, when administered perorally to a warm-blooded animal of about 60 kg. body weight in need of such treatment, produced a very effective β-adrenergic receptor blocking action.

EXAMPLE 9

Gelatin Capsules

The capsule filler composition was compounded from the following ingredients:

| | Parts |
|---|---|
| 1-(2'-cyano - phenoxy) - 2 - hydroxy-3-(1''-methylcyclohexylamino)-propane·HCl | 25.0 |
| Corn starch | 175.0 |
| Total | 200.0 |

Preparation: The components were intimately admixed with each other, and 200 mgm.-portions of the mixture were filled into gelatin capsules of suitable size. Each capsule contained 25 mgm. of the propanol salt and, when perorally administered to a warm-blooded animal of about 60 kg. body weight in need of such treatment, produced a very effective β-adrenergic receptor blocking action.

EXAMPLE 10

Hypodermic Solution

| | Parts |
|---|---|
| 1 - (2' - cyano-phenoxy)-2-hydroxy-3-(1''-methyl-cyclopentylamino)-propane·HCl | 2.5 |
| Sodium salt of EDTA (ethylenediamine-tetraacetic acid) | 0.2 |
| Distilled water, q.s. ad 100.0 parts. | |

Preparation: The propanol salt and the EDTA salt were dissolved in a sufficient amount of distilled water, and the solution was diluted to the desired volume with distilled water. The solution was filtered until free from suspended particles and filled into 1 cc. ampules under aseptic conditions. Finally, the ampules were sterilized and sealed. Each ampule contained 25 mgm. of the propanol salt, and when the contents thereof were intravenously administered to a warm-blooded animal of about 60 kg. body weight in need of such treatment, a very effective β-adrenergic receptor blocking action was produced.

EXAMPLE 11

Coated Sustained Release Tablets

The tablet core composition was compounded from the following ingredients:

| | Parts |
|---|---|
| 1-(2'-cyano - phenoxy) - 2 - hydroxy-3-(1''-methyl-cyclopentylamino)-propane·HCl | 25.0 |
| Carboxymethyl cellulose (CMC) | 295.0 |
| Stearic acid | 20.0 |
| Cellulose acetate phthalate (CAP) | 40.0 |
| Total | 380.0 |

Preparation: The propanol salt, the CMC and the stearic acid were intimately admixed with each other, and the mixture was granulated in customary fashion, using a solution of the CAP in 200 ml. of a mixture of ethanol and ethylacetate as the moistening agent. The granulate was then compressed into 380 mgm.-cores, which were coated in the usual way with an aqueous 5% solution of polyvinylpyrrolidone containing sugar. Each coated tablet contained 25 mgm. of the propanol salt and, when administered perorally to a warm-blooded animal of about 60 kg. body weight in need of such treatment, produced a very effective β-adrenergic receptor blocking action over an extended period of time.

EXAMPLE 12

Tablets With Combination of Active Ingredients

The tablet composition was compounded from the following ingredients:

| | Parts |
|---|---|
| 1-(2'-cyano-phenoxy) - 2 - hydroxy-3-(1''-methyl-cyclohexylamino)-propane·HCl | 35.0 |
| 2,6-bis-(diethanolamino) - 4,8 - dipiperidino-pyrimido-[5,4-d]pyrimidine | 75.0 |
| Lactose | 164.0 |
| Corn starch | 194.0 |
| Colloidal silicic acid | 14.0 |
| Polyvinylpyrrolidone | 6.0 |
| Magnesium stearate | 2.0 |
| Soluble starch | 10.0 |
| Total | 500.0 |

Preparation: The propanol salt, the lactose, the corn starch, the colloidal silicic acid and the polyvinylpyrrolidone were intimately admixed with each other, and the mixture was granulated in the usual way, using an aqueous solution of the soluble starch as the moistening agent. The granulate was admixed with magnesium stearate, and the composition was compressed into 500 mgm.- tablets. Each tablet contained 35 mgm. of the propanol salt and 75 mgm. of the pyrimido-pyrimidine compound and, when perorally administered to a warm-blooded animal of about 60 kg. body weight in need of such treatment, produced very effective β-adrenergic receptor blocking and coronary dilating actions.

Analogous results were obtained when any one of the other compounds embraced by formula I or a non-toxic acid addition salt thereof was substituted for the particular 1-phenoxy-3-amino-2-propanol salt in Examples 8 through 12. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and an effective β-adrenergic receptor blocking amount of a compound of the formula

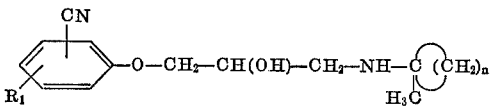

wherein
R₁ is hydrogen or methyl, and
n is 4, 5 or 6,
or a non-toxic, pharmacologically acceptable acid addition salt thereof.

2. A composition of claim 1, wherein said compound is 1-(2'-cyano-phenoxy) - 2 - hydroxy-3-(1''-methylcyclopentyl-amino)-propane or a non-toxic, pharmacologically acceptable acid addition salt thereof.

3. A composition of claim 1, wherein said compound is 1-(2'-cyano-phenoxy)-2-hydroxy-3-(1'' - methylcyclohexyl-amino)-propane or a non-toxic, pharmacologically acceptable acid addition salt thereof.

4. A composition of claim 1, wherein said compound is 1-(2'-cyano-5'-methyl-phenoxy) - 2 - hydroxy-3-(1''-methylcyclopentyl - amino)-propane or a non-toxic, pharmacologically acceptable acid addition salt thereof.

5. A composition of claim 1, wherein said compound is 1-(2'-cyano-5'-methyl - phenoxy) - 2 - hydroxy-3-(1''-methylcyclohexyl - amino)-propane or a non-toxic, pharmacologically acceptable acid addition salt thereof.

6. A composition of claim 1, wherein said compound is 1-(2'-cyano-5'-methyl-phenoxy) - 2 - hydroxy-3-(1''-methylcycloheptyl-amino) - propane or a non-toxic, pharmacologically acceptable acid addition salt thereof.

7. The method of blocking β-adrenergic receptors in a warm-blooded animal, which comprises administering to said animal an effective β-adrenergic receptor blocking amount of a compound

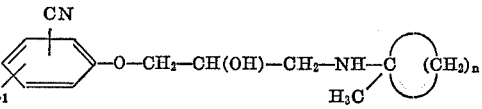

wherein
R₁ is hydrogen or methyl, and
n is 4, 5 or 6,
or a non-toxic, pharmacologically acceptable acid addition salt thereof.

8. The method of claim 7, wherein said compound is 1-(2'-cyano-phenoxy)-2-hydroxy - 3 - (1''-methylcyclopentyl-amino)-propane or a non-toxic, pharmacologically acceptable acid addition salt thereof.

9. The method of claim 7, wherein said compound is 1-(2'-cyano-phenoxy)-2-hydroxy - 3 - (1"-methylcyclohexyl-amino)-propane or a non-toxic, pharmacologically acceptable acid addition salt thereof.

10. The method of claim 7, wherein said compound is 1-(2'-cyano - 5' - methyl - phenoxy)-2-hydroxy-3-(1"-methylcyclopentyl-amino) - propane or a non-toxic, pharmacologically acceptable acid addition salt thereof.

11. The method of claim 7, wherein said compound is 1-(2'-cyano-5'-methyl - phenoxy) - 2 - hydroxy-3-(1"-methylcyclohexyl - amino)-propane or a non-toxic pharmacologically acceptable acid addition salt thereof.

12. The method of claim 7, wherein said compound is 1-(2'-cyano - 5' - methyl - phenoxy)-2-hydroxy-3-(1"-methylcycloheptyl - amino)-propane or a non-toxic, pharmacologically acceptable acid addition salt thereof.

References Cited

UNITED STATES PATENTS 3,459,782   8/1969   Hoppe et al. _____ 260—465

STANLEY J. FRIEDMAN, Primary Examiner

U.S. Cl. X.R.

424—282, 309, 311, 319, 324